June 24, 1930. R. L. STRAIN 1,766,410
EGG TURNING DEVICE
Filed July 5, 1927
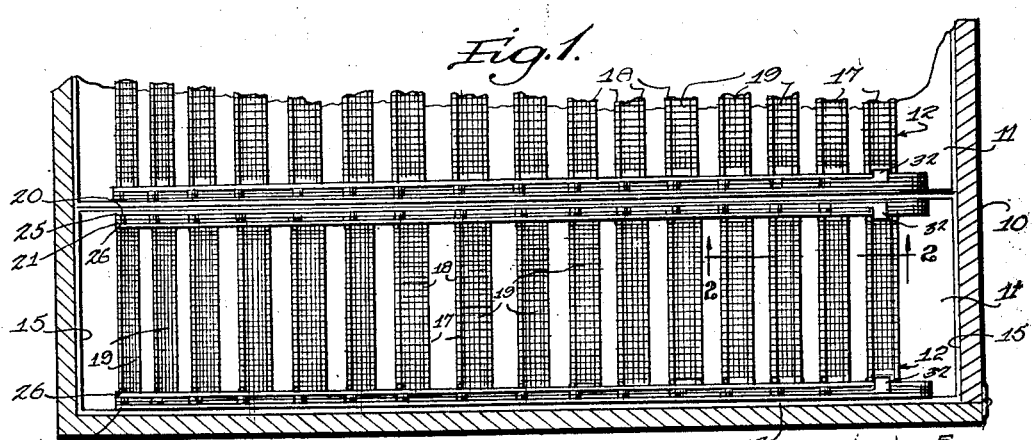
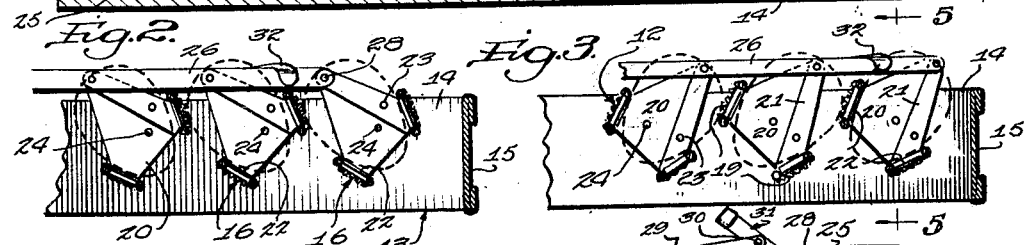
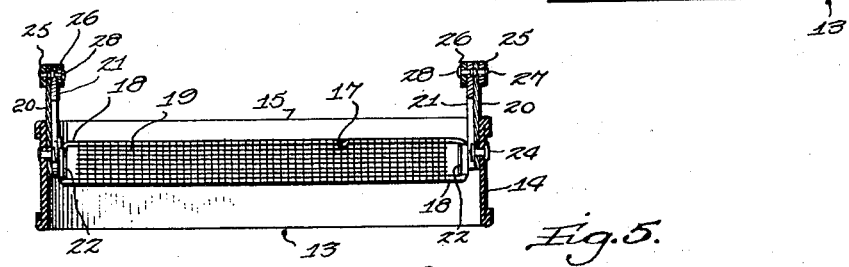
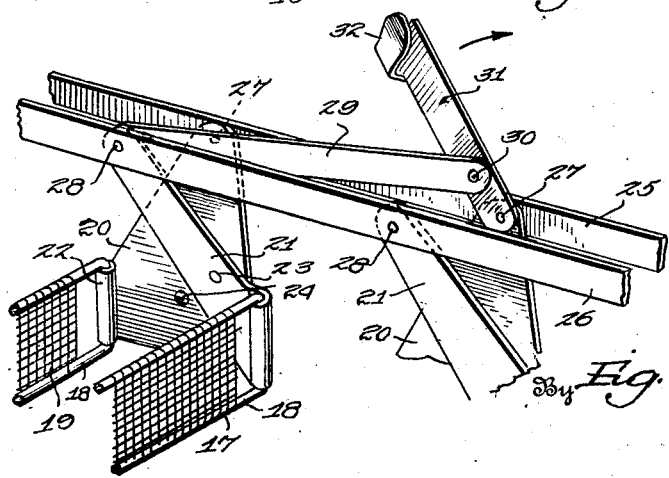
Inventor
ROBERT L. STRAIN
Attorney Patented June 24, 1930

1,766,410

UNITED STATES PATENT OFFICE

ROBERT L. STRAIN, OF GARNETT, KANSAS

EGG-TURNING DEVICE

Application filed July 5, 1927. Serial No. 203,533.

This invention relates to egg turning devices.

An important object of the invention is to provide novel means adapted to support an egg during the incubation period and to permit the egg to be turned at a different angle each day in accordance with the usual practice.

A further object is to provide a device of the above mentioned character which is adapted to discharge the eggs upon the supporting tray at the end of the incubation period thus permitting the device to be wholly removed from the incubator.

A further object is to provide an egg turning device comprising a plurality of cradles which are adapted to be turned at different angles when desired without altering the relationship between the portions thereof, means being provided for imparting relative movement to the elements of each cradle to permit the egg to be discharged therefrom into the supporting tray at the end of the incubation period.

A further object is to provide a plurality of egg supporting cradles each comprising a pair of oppositely arranged angularly disposed egg supporting panels connected at their ends to plates pivotally supported in a suitable frame and adapted to be simultaneously rocked about the pivots to permit the angular position of the eggs to be changed from day to day, the plates being adapted to partake of relative movement to separate the egg supporting panels and discharge the eggs therefrom at the end of the incubation period.

A further object is to provide a plurality of egg supporting cradles and novel actuating means including a pair of relatively movable members normally movable as a unit to swing the cradles and change the angular positions of the eggs, the operating members being adapted to partake of relative movement to discharge the eggs from the cradles.

Other objects and advantages of the invention will become apparent during the course of the following description.

In the drawings I have shown one embodiment of the invention. In this showing,

Figure 1 is a horizontal sectional view through a portion of an incubator,

Figure 2 is a fragmentary section on line 2—2 of Figure 1,

Figure 3 is a similar view showing the parts in a different position,

Figure 4 is a similar view showing the parts in dumping position,

Figure 5 is a detail section on line 5—5 of Figure 3, and,

Figure 6 is a detail perspective of one end of a cradle and the operating means therefor.

Referring to the drawings the numeral 10 designates an incubator of any suitable type in which are arranged egg trays 11. The device forming the subject matter of the present invention comprises an egg turning device 12 adapted to be arranged in each of the egg trays as will become apparent.

Each of the egg turning devices comprises a substantially rectangular frame 13 preferably formed of sheet metal and including side and end walls 14 and 15 respectively. A plurality of egg supporting cradles indicated as a whole by the numeral 16 are adapted to be arranged between the end walls of the frame 13. Each frame includes a pair of egg supporting panels 17 made up of substantially rectangular relatively heavy wire frames 18 having light screens 19 secured thereto. One of the panels 17 is supported at each end by a relatively large substantially triangular plate 20, while the other panel is supported at each end by a plate 21. Each of the plates is provided with an extension 22 turned about the adjacent end portion of one of the panel frames 18 whereby the latter frames are secured to their respective supporting plates.

Each end plate 20 is pivotally connected to its corresponding plate 21 by a rivet or the like 23, and each plate 20 is secured to the adjacent side wall 14 of the frame 13 by a rivet or similar pivot pin 24.

The upper ends of the plates 20 and 21 are pivotally connected to operating bars 25 and 26 by rivets or the like 27 and 28 respectively.

It will be apparent that the bars 25 and 26 are parallel to each other and arranged adjacent the side walls of the frame 13. These bars are movable simultaneously under some conditions and under other conditions are relatively movable to accomplish a result to be described. Adjacent one end of each bar 26 a link 29 is pivotally connected at one end to one of the rivets 28. The opposite end of this link is pivotally connected as at 30 intermediate the ends of a lever 31, one end of this lever being pivotally connected to one of the rivets 27, as clearly shown in Figure 5. A clip 32 is preferably formed integral with the opposite end of the lever 31 and is adapted to engage the adjacent bar 26 for a purpose to be described.

The operation of the device is as follows:

The lever 31 is swung in the direction of the arrow indicated in Figure 5 when it is desired to fill the device with eggs, each clip 32 being supported upon the adjacent bar 26. With the parts in the position described, each pivot pin 28 will be arranged in axial alinement with its corresponding pivot pin 27, and the panels 17 of each cradle will assume an angular relationship with respect to each other, as shown in Figures 2 and 3. Each cradle is then ready to receive the eggs which are placed therein points down as shown in dotted lines in Figures 2 and 3. When the link 29 and lever 31 are in the positions shown in Figures 2 and 3, the several pivot points of these elements are arranged substantially in alinement with each other and there is no tendency for the bars 25 and 26 to move longitudinally with respect to each other when they are actuated. With the eggs in the cradles, the bars 25 and 26 are moved longitudinally in one direction to the position indicated in Figure 2. Since the plates 20 and 21 are pivotally connected to each other by the rivets 23 and the rivets 27 and 28 coincide in position, the movement of the bars 25 and 26 in the manner stated causes the plates 20 and 21 of each cradle to move as a unit about the stationary pivot point 24. Thus the angular relationship between the panels of each cradle will not be altered. It is desired to change the angular positions of the eggs each day and this readily is accomplished by moving the bars 25 and 26 in the opposite direction thus again swinging the plates 20 and 21 of each cradle as a unit, to the position shown in Figure 3. This action causes each cradle to be swung to an angle of at least 90° but does not change the angular relation between the panels of each cradle, and accordingly the eggs will be supported therein. The shifting of the angular positions of the eggs takes place from day to day, or whenever desired, throughout the period of incubation as will be apparent. At the end of the incubation period it is desired to discharge the eggs from their respective cradles, and to remove the egg turning device from the egg trays. This is readily accomplished by lifting the free end of each lever 31 and swinging it to the position shown in Figures 4 and 6. Movement of these levers obviously causes relative longitudinal movement of the bars 25 and 26 thus swinging the plates 20 and 21 of each cradle about the pivot pins 23. This action causes the panels of each cradle to swing apart with the lower portions of the cradle opening, as shown in Figures 4 and 6, and the eggs will be discharged into the trays 11. The egg turning devices then may be removed from the trays.

From the foregoing it will be apparent that the present invention contemplates a device which is simple in construction and by the use of which eggs being incubated readily may be turned from day to day, the eggs being readily dischargeable from the device to permit the latter to be removed from the incubator at the end of the period of incubation.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A device of the character described comprising a pivoted cradle including a pair of relatively movable horizontally elongated members normally converging toward their lower edges to support a plurality of eggs therebetween, a pair of operating members connected respectively to said movable members and simultaneously movable to swing said cradle about its pivots, and means pivotally connected with said operating members for moving said operating members with respect to each other to impart relative movement to said first named members to discharge eggs therefrom.

2. A device of the character described comprising a frame, a cradle pivotally supported at its ends in said frame and including a pair of relatively movable horizontally elongated members normally converging toward their lower edges to support a plurality of eggs therebetween, a pair of operating members connected respectively to said movable members and simultaneously movable to swing said cradle about its pivots, and means connected between said operating members for moving them with respect to each other to swing the lower portions of said movable members away from each other to discharge eggs therefrom.

3. A device of the character described comprising a frame, a pair of horizontally elongated members extending across said frame and normally converging toward their lower edges to support a plurality of eggs therebetween, a plate pivotally connected to each side of said frame and secured to each end of one of said members, a second plate pivotally connected to each of said first named plates and secured to each end of the other of said members and wholly free of said frame, means for simultaneously swinging said plates about the pivots of the first named plates, and means for swinging said last named plates about their pivotal connections with said first named plates to swing the lower portions of said movable members away from each other and discharge eggs therefrom.

4. A device of the character described comprising a frame, a pair of horizontally elongated members extending across said frame and normally converging toward their lower edges to support a plurality of eggs therebetween, a pair of plates secured at their lower portions to the ends of one of said members and pivotally connected thereabove to the sides of said frame, a second pair of plates secured at their lower portions to the other of said members and pivotally connected to said first named plates and wholly free of said frame, an operating rod pivotally connected to each of said first named plates above the pivots thereof, and a second operating rod pivotally connected to each of said last named plates.

5. A device constructed in accordance with claim 4 provided with a lever pivotally connected at one end to each of said first named operating rods, and a link pivotally connected at one end to each of said second operating rods and at its opposite end to one of said levers intermediate the ends thereof.

In testimony whereof I affix my signature.

ROBERT L. STRAIN.